United States Patent
Abdar

(10) Patent No.: US 11,021,150 B2
(45) Date of Patent: Jun. 1, 2021

(54) CONTROLLING A MOTOR VEHICLE BASED UPON WIND

(71) Applicants: CO-AX Technology, Inc., Solon, OH (US); Hassan M. Abdar, Lakewood, OH (US)

(72) Inventor: Hassan M. Abdar, Lakewood, OH (US)

(73) Assignee: CO-AX TECHNOLOGY, INC., Solon, OH (US)

(*) Notice: Subject to any disclaimer, the term of this patent is extended or adjusted under 35 U.S.C. 154(b) by 88 days.

(21) Appl. No.: 15/372,911

(22) Filed: Dec. 8, 2016

(65) Prior Publication Data

US 2018/0162400 A1 Jun. 14, 2018

(51) Int. Cl.
*B60W 30/18* (2012.01)
*B60W 10/22* (2006.01)
(Continued)

(52) U.S. Cl.
CPC ...... *B60W 30/18009* (2013.01); *B60W 10/04* (2013.01); *B60W 10/184* (2013.01); *B60W 10/20* (2013.01); *B60W 10/22* (2013.01); *B60W 10/30* (2013.01); *B60W 30/02* (2013.01); *B60W 30/09* (2013.01); *B60W 30/143* (2013.01); *B60W 50/0098* (2013.01); *B60W 50/14* (2013.01); *G05D 1/0223* (2013.01); *G08G 1/0112* (2013.01); *G08G 1/0129* (2013.01); *G08G 1/0141* (2013.01);
(Continued)

(58) Field of Classification Search
None
See application file for complete search history.

(56) References Cited

U.S. PATENT DOCUMENTS 3,805,912 A * 4/1974 Mattson ............... B60C 23/002
                                                  180/118
4,810,022 A * 3/1989 Takagi ................. B62D 35/005
                                                  296/180.5
(Continued)

FOREIGN PATENT DOCUMENTS

AT             406140 B * 2/2000 ............ B62D 37/02
JP         2005014767 A * 1/2005
(Continued)

OTHER PUBLICATIONS

Tomita, Kouichi, Machine Translation of JP-2005014767-A, Jan. 2005, espacenet.com (Year: 2005).*

(Continued)

*Primary Examiner* — David P. Merlino
(74) *Attorney, Agent, or Firm* — Cooper Legal Group, LLC

(57) ABSTRACT

One or more devices, systems, and/or methods for controlling a motor vehicle based upon wind are provided. For example, a first measurement of wind detected by a first sensor coupled to the motor vehicle may be received from the first sensor. A second measurement of wind associated with a location of the motor vehicle may be received from a server. A wind effect (e.g., cost, inefficiency, danger, etc.) on the motor vehicle may be determined based upon the first measurement of wind and/or the second measurement of wind. A corrective action for the motor vehicle may be determined based upon the wind effect, and may be implemented on the motor vehicle.

13 Claims, 12 Drawing Sheets

(51) Int. Cl.
*B60W 30/14* (2006.01)
*B60W 10/30* (2006.01)
*B60W 30/02* (2012.01)
*B60W 10/20* (2006.01)
*B60W 10/184* (2012.01)
*B60W 10/04* (2006.01)
*B60W 50/00* (2006.01)
*B60W 50/14* (2020.01)
*B60W 30/09* (2012.01)
*G05D 1/02* (2020.01)
*G08G 1/0967* (2006.01)
*G08G 1/01* (2006.01)

(52) U.S. Cl.
CPC ... *G08G 1/09675* (2013.01); *G08G 1/096725* (2013.01); *G08G 1/096741* (2013.01); *G08G 1/096775* (2013.01); *B60W 2420/42* (2013.01); *B60W 2420/52* (2013.01); *B60W 2554/00* (2020.02); *B60W 2555/20* (2020.02); *B60W 2556/00* (2020.02); *G05D 2201/0213* (2013.01)

(56) References Cited

U.S. PATENT DOCUMENTS

| | | | | |
|---|---|---|---|---|
| 5,864,989 | A * | 2/1999 | Funatsu | E06B 3/40 49/141 |
| 6,072,387 | A * | 6/2000 | Overbeck | B60Q 1/52 340/425.5 |
| 9,827,848 | B1 * | 11/2017 | Sangha | B60K 11/085 |
| 9,959,771 | B1 * | 5/2018 | Carlson | G08G 5/0039 |
| 2007/0257512 | A1 * | 11/2007 | Anderson | B62D 35/00 296/180.1 |
| 2009/0259354 | A1 * | 10/2009 | Krupadanam | B60W 10/06 701/22 |
| 2011/0241377 | A1 * | 10/2011 | Rogers | B62D 35/001 296/180.3 |
| 2012/0217091 | A1 * | 8/2012 | Baillargeon | G08B 21/02 182/18 |
| 2012/0277952 | A1 * | 11/2012 | MacNeille | G01C 21/3453 701/36 |
| 2012/0296529 | A1 * | 11/2012 | Peake | A01B 69/008 701/50 |
| 2013/0080018 | A1 * | 3/2013 | Baek | B60W 30/16 701/96 |
| 2014/0023518 | A1 * | 1/2014 | O'Brien | B60C 23/12 417/1 |
| 2014/0175830 | A1 * | 6/2014 | Hasegawa | B62D 35/00 296/180.1 |
| 2014/0309864 | A1 * | 10/2014 | Ricci | G08B 25/016 701/36 |
| 2016/0244108 | A1 * | 8/2016 | Tsuruta | B62D 37/02 |
| 2016/0297434 | A1 * | 10/2016 | Merzig | B60W 30/16 |
| 2017/0113512 | A1 * | 4/2017 | Park | B60H 1/00849 |
| 2017/0284824 | A1 * | 10/2017 | Korzunov | G01C 21/3697 |
| 2017/0291600 | A1 * | 10/2017 | Styles | B60W 30/00 |
| 2018/0063487 | A1 * | 3/2018 | Gage | G01W 1/02 |
| 2018/0072414 | A1 * | 3/2018 | Cantrell | B64C 3/42 |
| 2018/0159593 | A1 * | 6/2018 | Bogdan | H04L 67/26 |

FOREIGN PATENT DOCUMENTS

| | | | | |
|---|---|---|---|---|
| JP | 2006193015 A | * | 7/2006 | B60C 23/004 |
| JP | 2009220616 A | * | 10/2009 | |
| WO | WO-2013049900 A1 | * | 4/2013 | B62D 35/00 |
| WO | WO-2014185012 A1 | * | 11/2014 | B60C 23/0408 |

OTHER PUBLICATIONS

Lehner Annemarie, Machine Translation of AT-406140-B, Feb. 2000, espacenet.com (Year: 2000).*
Tsuchimoto, Hidekazu, Machine Translation of JP-2009220616-A, Oct. 2009, espacenet.com (Year: 2009).*
Hisada Masaaki, Machine Translation of WO-2014185012-A1, Nov. 2014, espacenet.com (Year: 2014).*
Watabe, Nobuya, Machine Translation of JP-2006193015-A, Jul. 2006, espacenet.com (Year: 2006).*

* cited by examiner

CONTROLLING A MOTOR VEHICLE BASED UPON WIND

BACKGROUND

Operation of a motor vehicle may be influenced by various sources. For example, mechanically, a direction of the motor vehicle may be influenced by a steering wheel, while a speed of the motor vehicle may be influenced by a brake. Such mechanical sources of influence may have been incorporated into the design and function of the motor vehicle with engineering intent, and thus may contribute to, rather than detract from, an improved functioning of the motor vehicle. Other sources, such as forces of nature, may also influence operation of the motor vehicle, although often without engineering intent.

SUMMARY

In accordance with the present disclosure, one or more devices and/or methods for controlling a motor vehicle based upon wind are provided. In an example, a first measurement of wind detected by a first sensor coupled to the motor vehicle may be received (e.g., by a guidance system of the motor vehicle) from the first sensor. A second measurement of wind associated with a (e.g., GPS-determined) location of the motor vehicle may be received (e.g., by the guidance system of the motor vehicle) from a server (e.g., comprising wind and/or other weather-related satellite data). A wind effect (e.g., cost, inefficiency, danger, etc.) on the motor vehicle may be determined based upon the first measurement of wind and/or the second measurement of wind. A corrective action (e.g., open a channel, modify speed, modify center of gravity, activate an alarm for a driver of the motor vehicle, etc.) for the motor vehicle may be determined based upon the wind effect (e.g., to reduce a cost and/or inefficiency, to avoid a danger, etc.), and may be implemented on the motor vehicle.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Scenarios

The following provides a discussion of some types of scenarios in which the disclosed subject matter may be utilized and/or implemented.

1.1. Motor Vehicle

Figure 1:
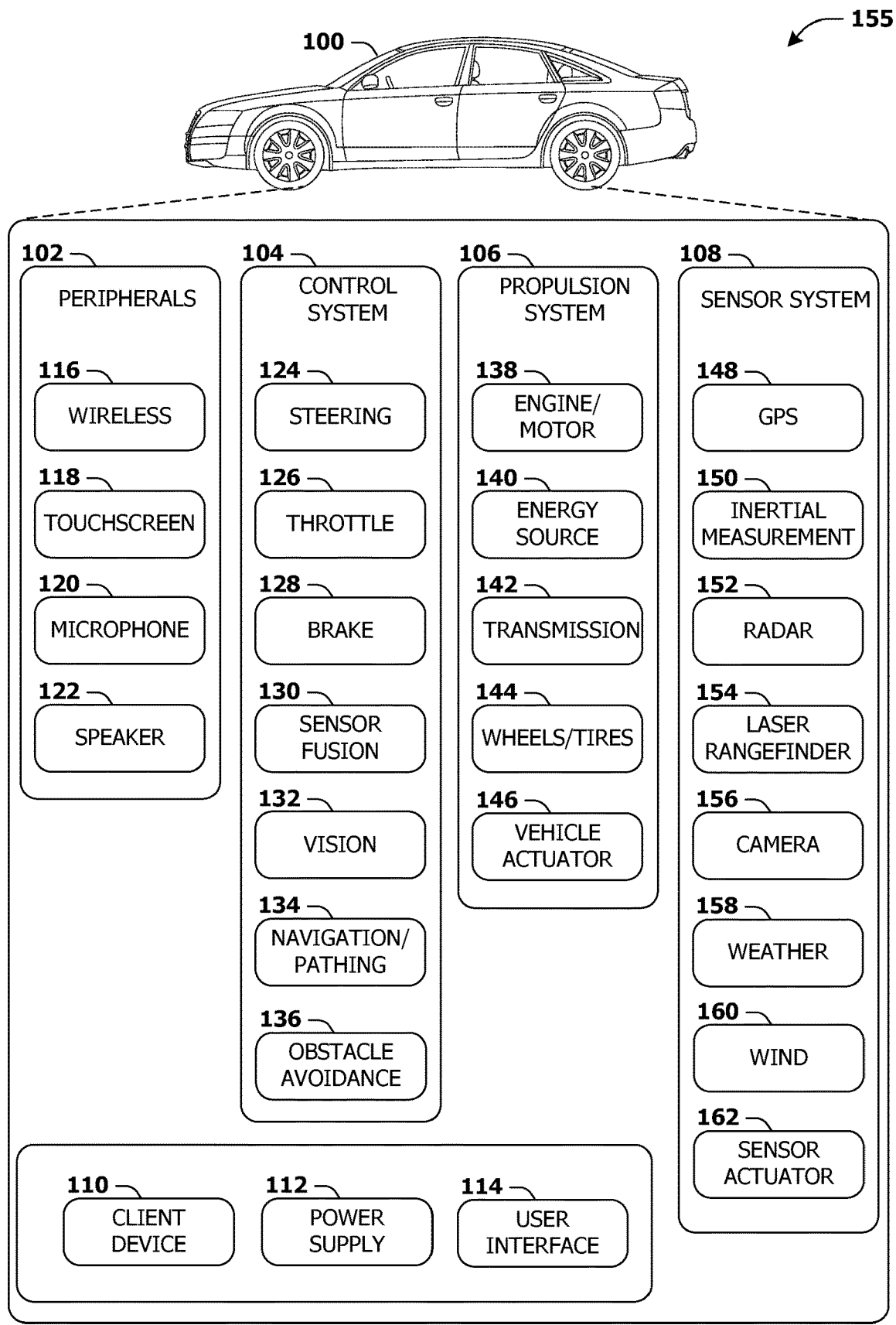
FIG. 1 is an illustration of a scenario involving an example configuration of a motor vehicle that may utilize and/or implement at least a portion of the techniques presented herein.

FIG. 1 presents a schematic architecture diagram 155 of a motor vehicle 100 that may utilize at least a portion of the techniques provided herein. The motor vehicle 100 may comprise or be coupled to one or more components configured to work with one other and/or with other components coupled to respective systems.

The one or more components may comprise peripherals 102, a control system 104, a propulsion system 106, a sensor system 108, a client device 110, a power supply 112 and/or a user interface 114. The client device 110 may be a controller of the motor vehicle 100, may be configured to receive information from and/or provide instructions to the peripherals 102, the control system 104, the propulsion system 106 and/or the sensor system 108, and/or may generate images to be displayed on the user interface 114 and/or receive inputs from the user interface 114. The power supply 112 may provide power to at least some of the components of the motor vehicle 100.

The peripherals 102 may comprise a wireless communication system 116, a touchscreen 118, a microphone 120, and/or a speaker 122. The wireless communication system 116 may be wirelessly coupled to one or more other motor vehicles, sensors, and/or other entities, either directly or via a communication network. The touchscreen 118 may be used by a user to input commands to the motor vehicle 100. For example, the touchscreen 118 may be configured to sense at least one of a position and a movement of a user's finger, and/or may be capable of sensing a level of pressure applied to the touchscreen 118. The microphone 120 may be configured to receive audio (e.g., a voice command or other audio input) (e.g., from a user of the motor vehicle 100), while the speakers 122 may be configured to output audio (e.g., to the user of the motor vehicle 100).

The control system 104 may control operation of the motor vehicle 100 and/or one or more components of the motor vehicle 100, and may comprise a steering unit 124, a throttle 126, a brake unit 128, a sensor fusion algorithm 130, a computer vision system 132, a navigation or pathing system 134, and/or an obstacle avoidance system 136. The steering unit 124 may be configured to adjust the heading or direction of the motor vehicle 100. The throttle 126 may be configured to control the operating speed and acceleration of the engine/motor 118 and/or the speed and acceleration of the motor vehicle 100. The brake unit 128 may be configured to decelerate the motor vehicle 100 (e.g., using friction to slow the wheels/tires 124). The brake unit 128 may be configured to be regenerative and convert the kinetic energy of the wheels/tires 124 to electric current. The sensor fusion algorithm 130 may comprise an algorithm executable by the client device 110 and configured to accept data (e.g., information sensed at one or more sensors) from the sensor system 108 as an input. The sensor fusion algorithm 130 may comprise a Kalman filter, a Bayesian network, another algorithm, and/or a combination of two or more algorithms. The sensor fusion algorithm 130 may be configured to provide assessments based on the data from the sensor system 108 (e.g., evaluations of objects and/or features in an environment of the motor vehicle 100, evaluations of particular situations, and/or evaluations of possible impacts based on particular situations). The computer vision system 132 may be configured to process and analyze images (e.g., captured by a camera 134) to identify objects (e.g., people, other motor vehicles, obstacles, etc.) and/or features (e.g., lane information, traffic signals, etc.) in the environment of the motor vehicle 100, map the environment, track objects, estimate speed of objects, and/or may make use of an object recognition algorithm, a Structure from Motion (SFM) algorithm, video tracking, and/or other computer vision techniques. The navigation and pathing system 134 may be configured to determine a driving path for the motor vehicle 100, update the driving path dynamically while the motor vehicle 100 is in operation, and may do so incorporate data from the sensor fusion algorithm 130, a Global Positioning System (GPS) unit 148, and/or one or more predefined maps. The obstacle avoidance system 136 may be configured to identify, evaluate, and take action to avoid or otherwise negotiate obstacles in the environment of the motor vehicle 100.

The propulsion system 106 may provide powered motion for the motor vehicle 100 and/or one or more components of the motor vehicle 100, and may comprise an engine/motor 138, an energy source 140, a transmission 142, wheels/tires 144 and/or vehicle actuator(s) 146. The engine/motor 138 may comprise an internal combustion engine, an electric motor, a steam engine, a Stirling engine, and/or any combination thereof. The energy source 140 may be a source of energy that powers the engine/motor 138 (e.g., at least in part), such as gasoline, diesel, other petroleum-based fuels, propane, other compressed gas-based fuels, ethanol, solar panels, batteries, other sources of electrical power, fuel tanks, batteries, capacitors, and/or flywheels. The transmission 142 may be configured to transmit mechanical power from the engine/motor 138 to the wheels/tires 144, and may comprise a gearbox, clutch, differential and/or drive shafts comprising one or more axles configured to be coupled to the wheels/tires 144. The vehicle actuator(s) 146 may be configured to modify a position and/or orientation of one or more portions of the motor vehicle 100. For example, the vehicle actuator(s) 146 may be configured to raise or lower a height and/or center of gravity of the motor vehicle 100 (e.g., by changing a pressure or other property of the wheels/tires 144, by raising or lowering at least some of a body of the motor vehicle 100 relative to the wheels/tires 144 and/or relative to the ground upon which the motor vehicle 100 is on, etc.), to open and/or close one or more channels of the motor vehicle 100 and/or to open and/or close one or more windows of the motor vehicle 100.

The sensor system 108 may sense information about the environment of the motor vehicle 100 and/or one or more components of the motor vehicle 100, and may comprise the GPS unit 148, an inertial measurement unit (IMU) 150, a radio detection and ranging (RADAR) unit 152, a laser rangefinder and/or light detection and ranging (LIDAR) unit 154, a camera 156, a weather unit 158, a wind unit 160 and/or sensor actuator(s) 162. The GPS unit 148 may comprise a sensor (e.g., and/or a transceiver) configured to estimate a geographic location of the motor vehicle 100. The IMU 150 may comprise one or more sensors configured to sense attitude, position and/or orientation changes of the motor vehicle 100 based on inertial acceleration (e.g., using accelerometers and/or gyroscopes). The RADAR unit 152 may use radio waves to detect an object and/or determine characteristics of the object such as range, altitude, direction, and/or speed of the object by transmitting pulses of radio waves and/or microwaves that may bounce off any object in a path of the waves. The laser rangefinder and/or LIDAR unit 154 may include a sensor configured to detect objects (e.g., and determine distance to the objects and/or other properties associated with the objects) in the environment of the motor vehicle 100 using visible light from lasers. The camera 156 (e.g., a still camera, a video camera, etc.) may capture images of the environment of the motor vehicle 100, and may be configured to detect visible light and/or light from other portions of the spectrum (e.g., infrared light, ultraviolet light, etc.). The weather unit 158 may be configured to determine one or characteristics of weather of the environment of the motor vehicle 100. For example, the weather unit 158 may use one or more sensors (e.g., and/or other sources) to determine whether the motor vehicle 100 is currently (e.g., or will soon be) subject to rain, snow, hail, etc. The wind unit 160 may be used to sense (e.g., detect, measure, etc.) wind (e.g., a bulk movement of air) on and/or near the motor vehicle 100. The sensor actuator(s) 162 may be configured to modify a position and/or orientation of one or more sensors of the sensor system 108.

1.2. Server Configuration

Figure 2:
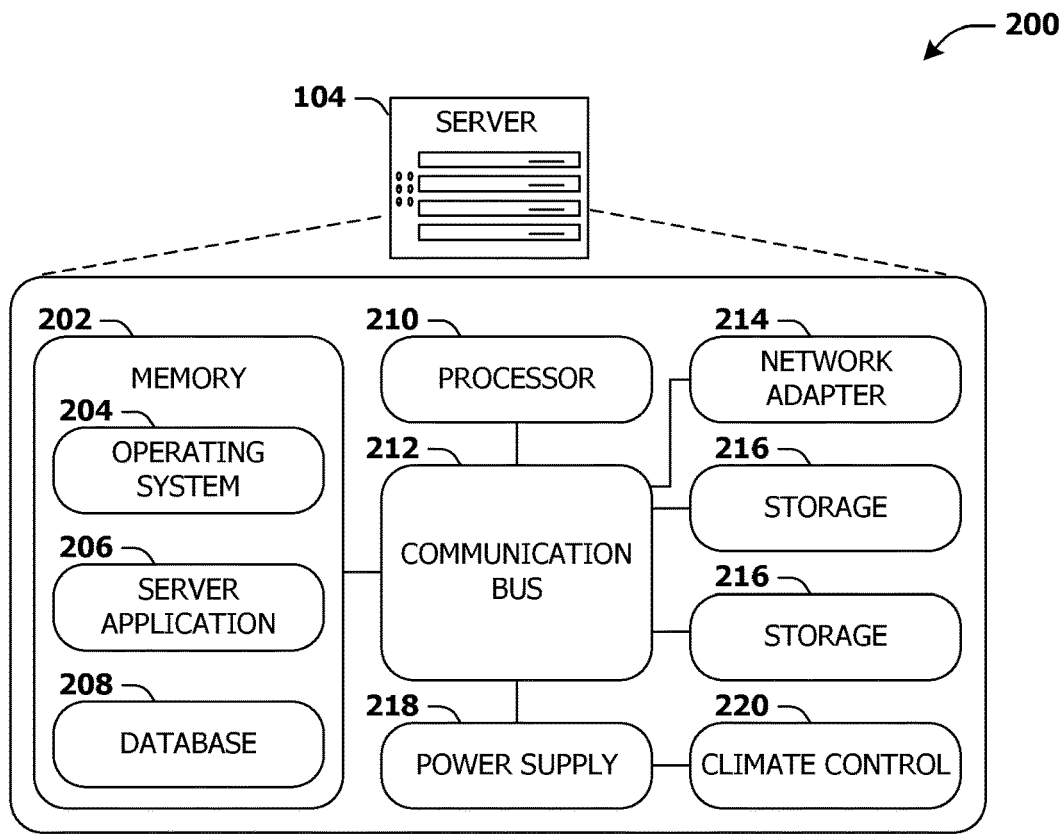
FIG. 2 is an illustration of a scenario involving an example configuration of a server that may utilize and/or implement at least a portion of the techniques presented herein.

FIG. 2 presents a schematic architecture diagram 200 of a server 109 that may utilize at least a portion of the techniques provided herein. Such a server 109 may vary widely in configuration or capabilities, alone or in conjunction with other servers, in order to provide a service such as the service 102.

The server 109 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 109 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 109 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 109 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 109 with at least one other server. Other components that may optionally be included with the server 109 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 109 to a state of readiness.

The server 109 may operate in various physical enclosures, such as a desktop or tower, and/or may be integrated with a display as an "all-in-one" device. The server 109 may be mounted horizontally and/or in a cabinet or rack, and/or may simply comprise an interconnected set of components. The server 109 may comprise a dedicated and/or shared power supply 218 that supplies and/or regulates power for the other components. The server 109 may provide power to and/or receive power from another server and/or other devices. The server 109 may comprise a shared and/or dedicated climate control unit 220 that regulates climate properties, such as temperature, humidity, and/or airflow. Many such servers 109 may be configured and/or adapted to utilize at least a portion of the techniques presented herein.

1.3. Client Device Configuration

Figure 3:
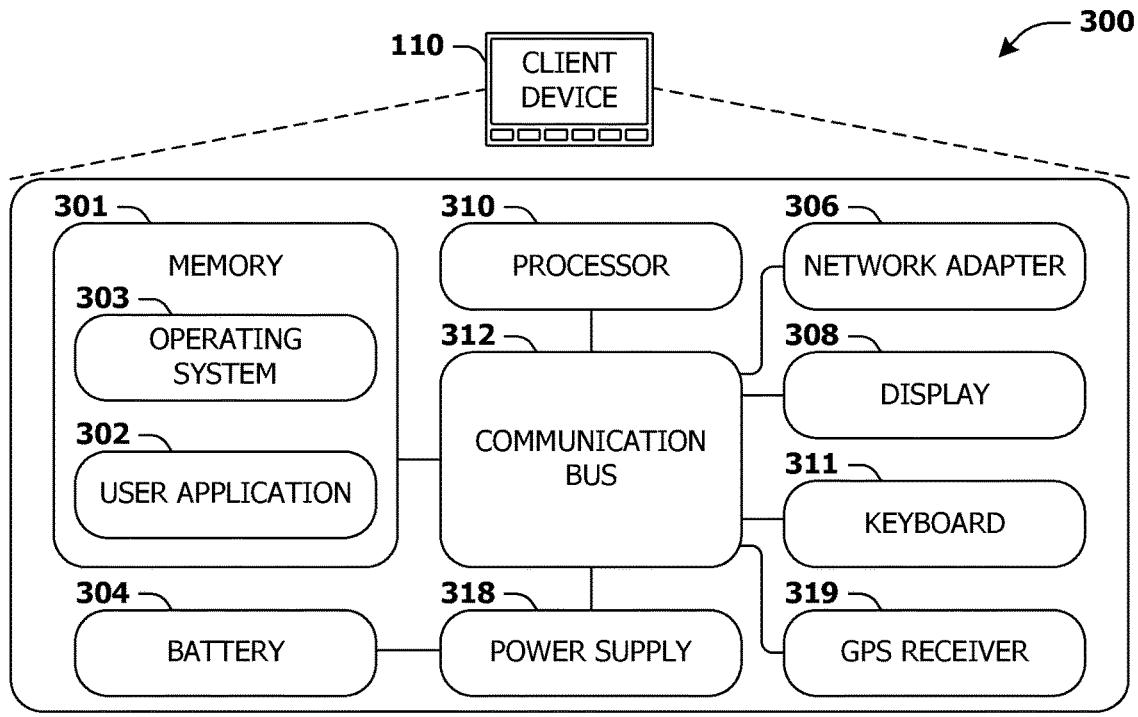
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a GPS receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for controlling a motor vehicle based upon wind are provided. For example, the motor vehicle being driven on a road may encounter a force of nature such as wind. The wind may increase a cost and/or inefficiency associated with operating the motor vehicle, such as by serving as a force of resistance relative to the direction that the motor vehicle is being directed. The wind may also pose a danger to the well-being of the motor vehicle and/or a driver of the motor vehicle. For example, the wind, if strong enough, may increase a risk of the motor vehicle losing desired balance. In another example, the wind may increase a risk of a door of the motor vehicle striking a person or object if the door is (e.g., partially) opened (e.g., when the vehicle is stationary). Available methods of controlling the motor vehicle may neglect to use wind to control the vehicle, and/or may merely make use of consequences of wind, rather than detecting wind itself and controlling and/or otherwise guiding the motor vehicle accordingly. Thus, in accordance with one or more of the techniques presented herein, the motor vehicle may be controlled, based upon wind, in a manner that improves efficiency and/or safety while decreasing cost.

Figure 4:
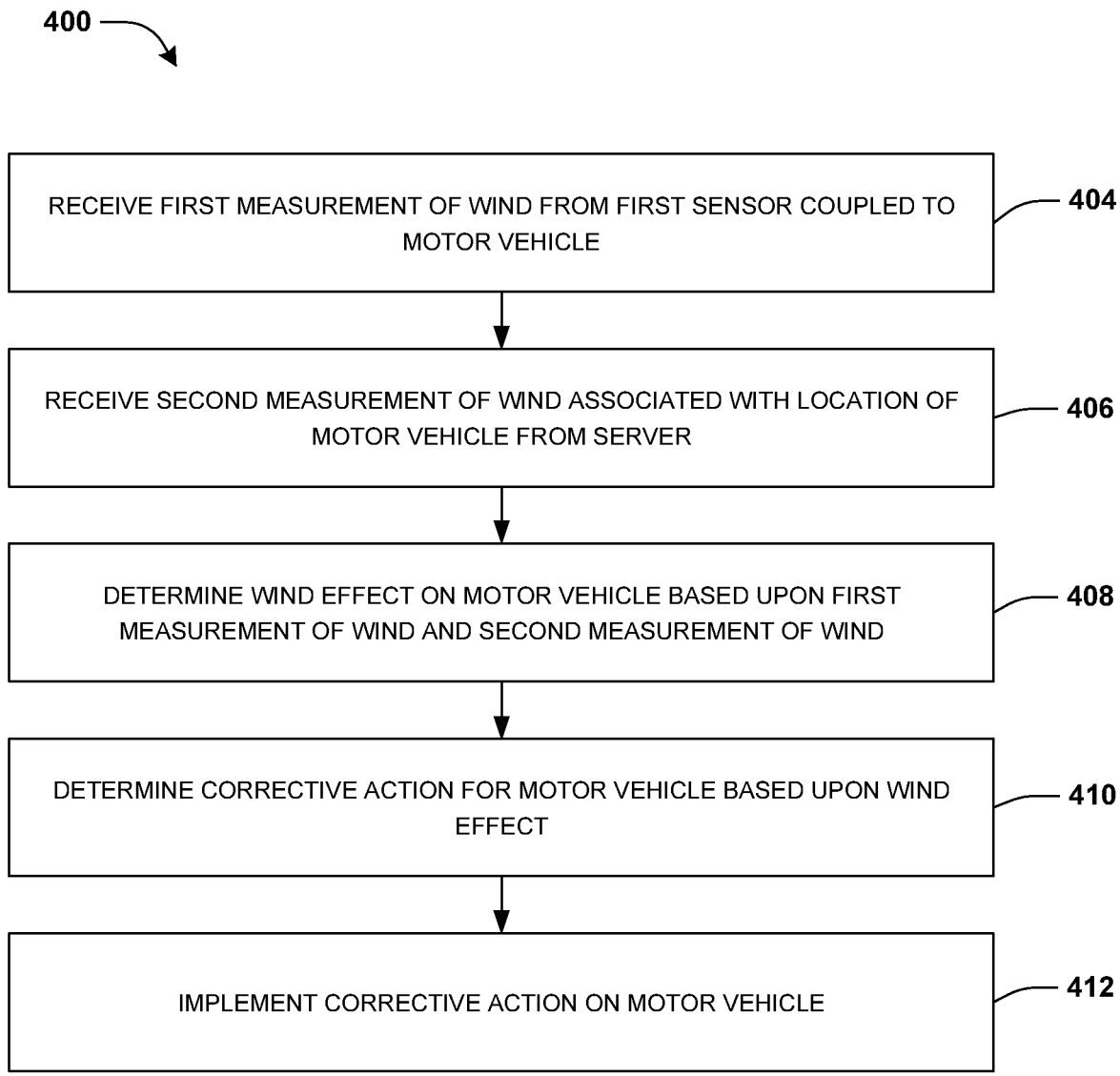
FIG. 4 is a flow chart illustrating an example method for controlling a motor vehicle based upon wind.

An embodiment of controlling a motor vehicle based upon wind is illustrated by an example method 400 of FIG. 4. The motor vehicle may be a wheeled, self-propelled road vehicle or off-road vehicle, and may be operated by a driver seated in the motor vehicle, a user directing the motor vehicle remotely and/or a computing device directing the motor vehicle based upon instructions. The motor vehicle may be a car, a bus, a motorcycle, a truck, etc. During operation, the motor vehicle and/or an operator of the motor vehicle may encounter various forces of nature, such as wind. Accordingly, at 404, a first measurement of wind detected by a first sensor coupled to the motor vehicle may be received (e.g., by a guidance system of the motor vehicle) from the first sensor. The first measurement of wind may comprise a speed, direction and/or other measurement associated with the wind.

The first sensor may be physically attached to a portion of the motor vehicle, such as a front portion of the motor vehicle (e.g., a front bumper, a front hood, a headlight, etc.), a side of the motor vehicle (e.g., a door, a door handle, a window, a portion of a body of the motor vehicle below the door, etc.), a rear portion of the motor vehicle (e.g., a rear bumper, a trunk, a rear light, etc.), a top portion of the motor vehicle (e.g., a roof, an antenna, etc.), a bottom portion of the motor vehicle and/or within the motor vehicle (e.g., beneath the hood or trunk, within the passenger compartment, etc.).

The first sensor may comprise an anemometer or another device used to detect and/or measure wind. The anemometer may be a velocity anemometer, such as a cup anemometer, a vane anemometer (e.g., a helicoid propeller anemometer, a digital anemometer, etc.), a hot-wire anemometer (e.g., a constant current anemometer (CCA), a constant voltage anemometer (CVA), a constant temperature anemometer (CTA), a pulse-width modulation (PWM) anemometer, etc.), a laser Doppler anemometer, an ultrasonic anemometer (e.g., two-dimensional, three-dimensional, acoustic resonance, etc.) and/or a ping-pong ball anemometer. Alternatively and/or additionally, the anemometer may be a pressure anemometer, such as a plate anemometer and/or a tube anemometer (e.g., a Pitot tube static anemometer).

In some examples, the first sensor may be a microelectromechanical systems (MEMS) sensor that measures wind and/or measures a force other than wind, where the force other than wind may be converted and/or correlated to wind.

At 406, a second measurement of wind associated with a (e.g., current, predicted, etc.) location of the motor vehicle may be received (e.g., by the guidance system of the motor vehicle) from a server. The server may comprise wind and/or other weather-related (e.g., satellite) data. The server may collect the data from one or more sources, such as satellites orbiting Earth, analyze the data to determine (e.g., current, predicted, etc.) wind measurements for one or more locations, and provide wind data to one or more subscribers (e.g., such as a driver of the motor vehicle) upon request.

In an example, the location of the motor vehicle may be determined based upon a GPS sensor. For example, the GPS sensor may be located in or near the motor vehicle (e.g., in a nearby motor vehicle located within a threshold distance of the motor vehicle, in a mobile device of a driver or passenger of the motor vehicle and/or the nearby motor vehicle, etc.), and may be used to determine information (e.g., coordinates, an address, etc.) corresponding to a location where the GPS sensor (e.g., and by extension, the motor vehicle) may be physically located. Alternatively and/or additionally, the GPS sensor may be used to predict (e.g., based upon a route associated with the instant operation of the motor vehicle, based upon a driving history of the motor vehicle or a user of the motor vehicle, etc.) information (e.g., coordinates, an address, etc.) corresponding to a location where the motor vehicle is expected to be physically located (e.g., within a threshold period of time). In the example, the location (e.g., GPS coordinates) may be provided to the server (e.g., as part of a request for wind information from the server). The second measurement of wind may be received from the server in response to the providing of the location (e.g., as part of a response to the request for wind information). It may be appreciated that the server may authenticate the request for wind information (e.g., with a username, password, subscriber information, etc.) prior to providing the second measurement of wind.

In an example, the first measurement of wind and/or the second measurement of wind may be provided to the server (e.g., and/or another server) (e.g., as part of a feedback mechanism (e.g., of an application), etc.). The server may use the first measurement of wind (e.g., in combination with another measurement of wind from another motor vehicle, etc.) to provide information (e.g., a prediction, weather information, driving condition information, etc.) to one or more other users.

At 408, a wind effect on the motor vehicle may be determined based upon the first measurement of wind from the first sensor and/or the second measurement of wind from the server. For example, a determination may be made that the motor vehicle is (e.g., and/or faces an increased probability of) being slowed down (e.g., independent of brake activity), misdirected (e.g., pushed off-course, independent of steering activity), made to operate inefficiently (e.g., a distance travelled per amount of fuel may be decreasing), and/or exposed to danger (e.g., loss of balance) at least partially as a result of the wind.

In an example, a third measurement of wind detected by a second sensor coupled to the motor vehicle may be received (e.g., by the guidance system of the motor vehicle) from the second sensor. The wind effect may be determined based upon the first measurement of wind, the second measurement of wind and/or the third measurement of wind. The first sensor may be configured to detect wind from a first direction, while the second sensor may be configured to detect wind from a second direction (e.g., different than the first direction). The second direction may be perpendicular to the first direction. In some embodiments, the second direction may be less than 90 degrees from the first direction, while in other embodiments, the direction may be more than 90 degrees from the first direction. Embodiments with a third sensor, a fourth sensor, or any number of sensors (e.g., each configured to detect wind from a direction a same number of degrees away from a direction of the next sensor) may be contemplated. In an example, one or more of the sensors may be rotating.

In an example of determining the wind effect, at least one of the first measurement of wind, the second measurement of wind or a combination of the first measurement of wind and the second measurement of wind may be compared to a database associating wind measurements with wind effects corresponding to the wind measurements to determine the wind effect. For example, the first measurement of wind, the second measurement of wind and/or the combination may be used to mine the database for one or more matching measurements and/or one or more wind effects associated with the one or more matching measurements in the database. It may be appreciated that the database may be selected from a plurality of (e.g., similar) databases based upon a determination that the motor vehicle is of a first type of motor vehicle (e.g., where type may correspond to make, model, year, weight, size, weight distribution, dimensions, etc.) and the wind effects in the database correspond to the first type of motor vehicle.

In another example of determining the wind effect, at least one of the first measurement of wind, the second measurement of wind or a combination of the first measurement of wind and the second measurement of wind may be input (e.g., along with one or more details about the motor vehicle, such as make, model, year, weight, size, weight distribution, dimensions, etc.) to an artificial intelligence (AI) unit which may be used to determine the wind effect. The AI unit may use symbolic AI such as cognitive simulation, logic-based AI, anti-logic (e.g., scruffy AI), knowledge-based AI (e.g., an expert system), and/or sub-symbolic AI, such as bottom-up, embodied agent, situated, behavior-based AI, nouvelle AI and/or computational intelligence (e.g., using neural networks), as well as other techniques.

At 410, a corrective action (e.g., open a channel, modify speed, modify center of gravity, etc.) for the motor vehicle may be determined based upon the wind effect (e.g., to mitigate the wind effect). For example, a determination may be made that modification of an operation of one or more (e.g., mechanical) components of the motor vehicle would improve performance of the motor vehicle and/or reduce one or more adverse aspects of the wind effect. For example, a corrective action for a wind effect that involves a decrease in efficiency may involve changing direction (e.g., or recommending a change in direction) or modifying a center of gravity of the motor vehicle. It may be appreciated that the corrective action may involve a single action and/or a single component of the motor vehicle, or a combination of actions and/or a combination of components of the motor vehicle.

In an example of determining the corrective action, the wind effect may be compared to a database associating wind effects with corrective actions corresponding to the wind effects to determine the corrective action. For example, the wind effect may be used to mine the database for one or more matching wind effects and/or one or more corrective actions associated with the one or more matching wind effects in the database. It may be appreciated that the database may be selected from a plurality of (e.g., similar) databases based upon a determination that the motor vehicle is of a first type of motor vehicle (e.g., where type may correspond to make, model, year, weight, size, weight distribution, dimensions, etc.) and the corrective actions in the database correspond to the first type of motor vehicle.

In another example of determining the corrective action, the wind effect may be input (e.g., along with one or more details about the motor vehicle, such as make, model, year, weight, size, weight distribution, dimensions, etc.) to the AI unit which may be used to determine the corrective action.

At 412, the corrective action may be implemented on the motor vehicle. For example, one or more actions may be taken to modify one or more operations and/or components of the motor vehicle in a manner determined likely to mitigate one or more adverse consequences of the wind effect and/or to improve one or more measures of performance of the motor vehicle.

In an example of implementing the corrective action, a speed and/or acceleration at which the motor vehicle is travelling may be modified (e.g., increased, decreased, etc.) based upon the wind effect. For example, the speed may be increased and/or decreased from a first speed to a second speed (e.g., if the motor vehicle is determined to be likely perform better (e.g., in terms of stability, safety, efficiency, etc.) in the wind at the second speed).

In an example of implementing the corrective action, a center of gravity of at least some of the motor vehicle may be modified (e.g., raised up, lowered down, etc.) (e.g., relative to one or more axles of the motor vehicle, relative to a ground upon which the motor vehicle is located, etc.) based upon the wind effect. For example, the center of gravity of at least some of the motor vehicle may be raised and/or lowered from a first point to a second point (e.g., if the motor vehicle is determined to be likely perform better (e.g., in terms of stability, safety, efficiency, etc.) in the wind at the second point).

In an example of implementing the corrective action, a height of at least some of the motor vehicle (e.g., one or more wheels and/or tires, a frame of the motor vehicle, a roof of the motor vehicle, etc.) may be modified (e.g., raised up, lowered down, etc.) (e.g., relative to one or more axles of the motor vehicle, relative to a ground upon which the motor vehicle is located, etc.) based upon the wind effect. For example, the height of at least some of the motor vehicle may be increased and/or decreased from a first height to a second height (e.g., if the motor vehicle is determined to be likely perform better (e.g., in terms of stability, safety, efficiency, etc.) in the wind at the second height). It may be appreciated that the modification of the height of the motor vehicle may be performed using height adjustable suspension (e.g., to change ground clearance), and/or by modifying one or more characteristics (e.g., pressure) of tires of the motor vehicle (e.g., by increasing or decreasing air pressure). It may be appreciated that the modification of the height of the motor vehicle may be performed as part of the modification of the center of gravity of the motor vehicle.

In an example of implementing the corrective action, a drag force on at least some of the motor vehicle may be modified (e.g., decreased, increased, etc.) based upon the wind effect. For example, the drag force on at least some of the motor vehicle may be increased and/or decreased from a first drag force to a second drag force (e.g., if the motor vehicle is determined to be likely perform better (e.g., in terms of stability, safety, efficiency, etc.) in the wind at the second drag force).

In an example of modifying the drag force, a level of openness of a channel (e.g., corresponding to a measure of how open the channel is relative to its maximum capacity to be opened) of the motor vehicle may be modified from a first level of openness (e.g., fully closed) to a second level of openness (e.g., fully open) to attain the second drag force on the motor vehicle. For example, the level of openness of the channel of the motor vehicle may be increased and/or decreased from a first level of openness to a second level of openness (e.g., if the motor vehicle is determined to be likely perform better (e.g., in terms of stability, safety, efficiency, etc.) in the wind at the second level of openness). It may be appreciated that the first and/or second level of openness may be a level different than fully open or fully closed, such as a partial level of openness (e.g., 10%, 20%, etc.). Any partial level of openness may be contemplated.

In an example, the channel of the motor vehicle may correspond to one or more windows of the motor vehicle. In an example of the modifying the level of openness, the one or more windows may be raised or lowered from the first level of openness to the second level of openness. It may be appreciated that a determination of weather (e.g., currently surrounding the motor vehicle, predicted to soon reach the motor vehicle, etc.) may be made prior to modifying the level of openness of the one or more windows, and the modifying the level of openness may be performed based upon the weather. For example, responsive to determining that the weather is associated with rain or snow, or weather otherwise determined to be unsuitable for open windows, the one or more windows may not be opened and/or may be closed (e.g., regardless of the corrective action requiring that the one or more windows be opened, unless the wind effect is determined to exceed a threshold urgency (e.g., relative to a level of inconvenience associated with the weather)). In another example, responsive to determining that the weather is associated with sunshine or clear skies, or weather otherwise determined to be suitable for open windows, the one or more windows may be opened (e.g., in accordance with the corrective action).

In some examples, a first set of the one or more windows may be opened to a different level of openness than a second set of the one or more windows. For example, each window of the motor vehicle may be opened to a level of openness calculated to provide (e.g., in combination with the various levels of opennesses of the other windows) an optimum change in drag force.

In some examples, the channel may not be one or more windows of the motor vehicle. For example, the channel may comprise an opening on the front end of the motor vehicle (e.g., above, below, or adjacent to a headlight or other front-facing light, built into the windshield, etc.) and an opening on the rear end of the vehicle (e.g., above, below, or adjacent to a rear-facing light, built into the rear windshield, etc.). Embodiments with two or more such channels may be contemplated.

Figure 5A:
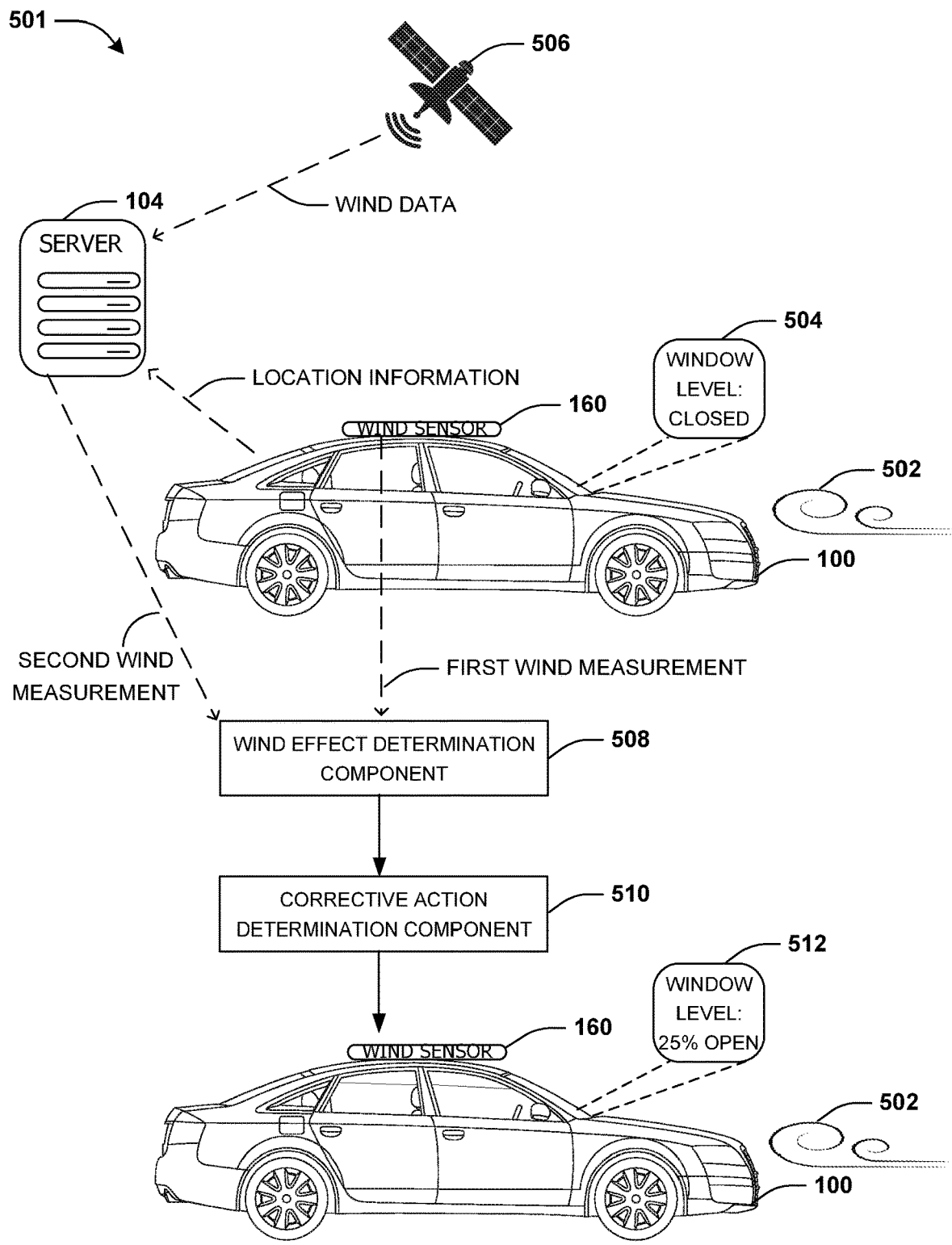
FIG. 5A is a component block diagram illustrating an example system for controlling a motor vehicle based upon wind, where a level of openness of a channel of the motor vehicle is modified.

FIGS. 5A-5E illustrate examples of a system 501 for controlling a motor vehicle 100 based upon wind 502. FIG. 5A illustrates a first scenario where the motor vehicle 100 may be controlled based upon wind 502. The wind 502 may blow towards one or more sides of the motor vehicle 100, such as towards a face of the motor vehicle 100. An initial interface 504 (e.g., on a dashboard, windshield, etc. of the motor vehicle 100) may display a status of one or more components of the motor vehicle 100, such as, for example, an indication that one or more windows are closed. A wind sensor 160 may be coupled to the motor vehicle 100, and may provide a first wind measurement to a wind effect determination component 508. Location information associated with the motor vehicle 100 may be provided to a server 104, which may receive wind and/or other weather-related data from a satellite 506. The server 104 may use the location information to identify a second wind measurement corresponding to the location of the motor vehicle 100, and may provide the second wind measurement to the wind effect determination component 508. The wind effect determination component 508 may use the first wind measurement and/or the second wind measurement to determine a wind effect (e.g., by comparing to a database, using an AI unit, etc.), and may provide the wind effect to a corrective action determination component 510. The corrective action determination component 510 may use the wind effect to determine a corrective action (e.g., by comparing to a database, using an AI unit, etc.), and may provide the corrective action to one or more components of the motor vehicle 100 for implementation. For example, as an updated interface 512 may indicate, one or more windows may be changed from a first level of openness (e.g., closed) to a second level of openness (e.g., 25% open).

Figure 5B:
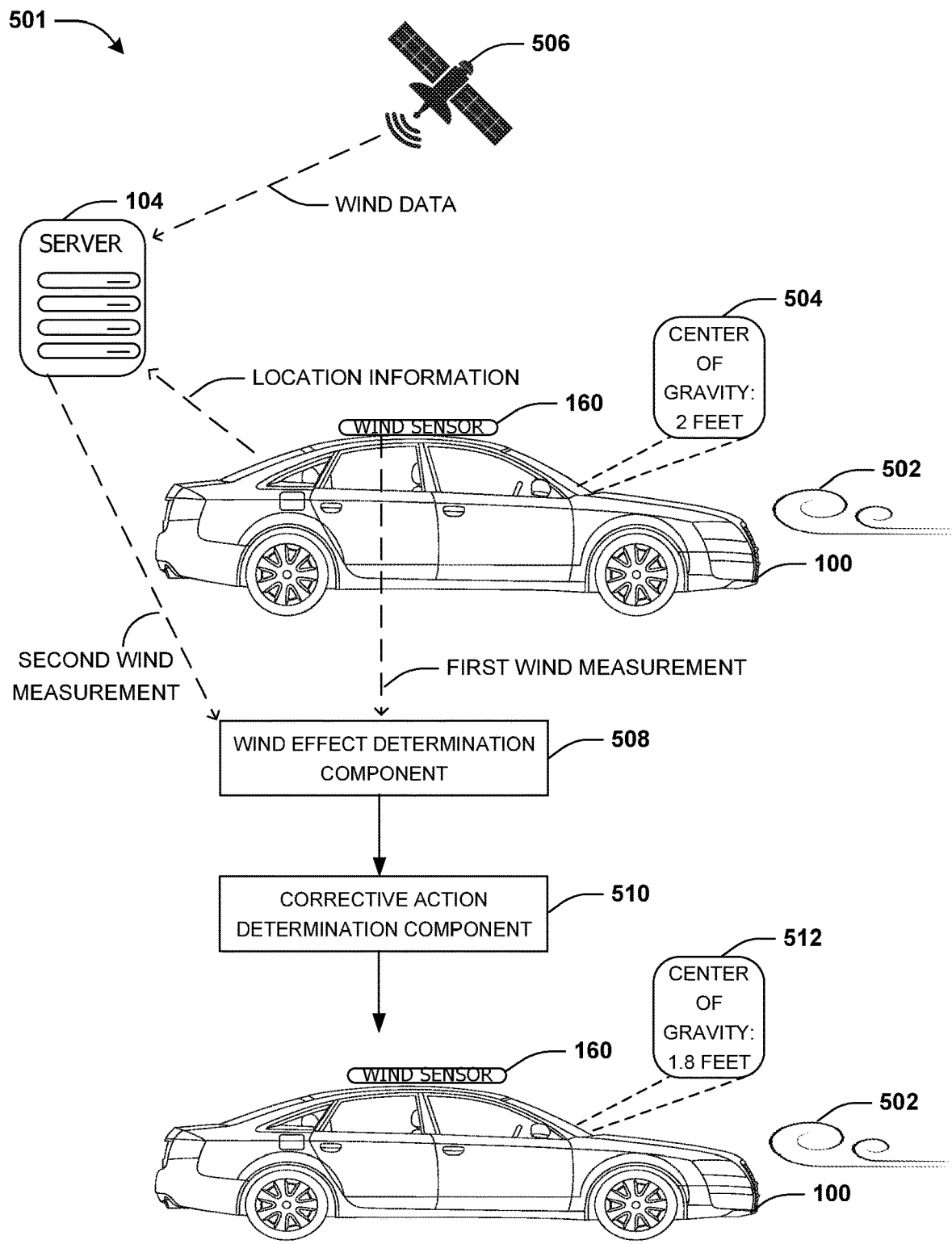
FIG. 5B is a component block diagram illustrating an example system for controlling a motor vehicle based upon wind, where a center of gravity of at least some of the motor vehicle is modified.

FIG. 5B illustrates a second scenario where the motor vehicle 100 may be controlled based upon wind 502. The initial interface 504 (e.g., on a dashboard, windshield, etc. of the motor vehicle 100) may display a status of one or more components of the motor vehicle 100, such as, for example, an indication that a center of gravity of the motor vehicle 100 is 2 feet above the ground. The wind effect determination component 508 may use the first wind measurement from the wind sensor 160 and/or the second wind measurement from the server 104 to determine the wind effect, and the corrective action determination component 510 may use the wind effect to determine the corrective action, which may be provided to one or more components of the motor vehicle 100 for implementation. For example, as the updated interface 512 may indicate, the center of gravity may be changed from a first center of gravity (e.g., 2 feet from the ground) to a second center of gravity (e.g., 1.8 feet from the ground) (e.g., by changing a pressure of one or more tires, by changing a height of a frame of the motor vehicle 100 relative to the ground and/or the tires, etc.).

Figure 5C:
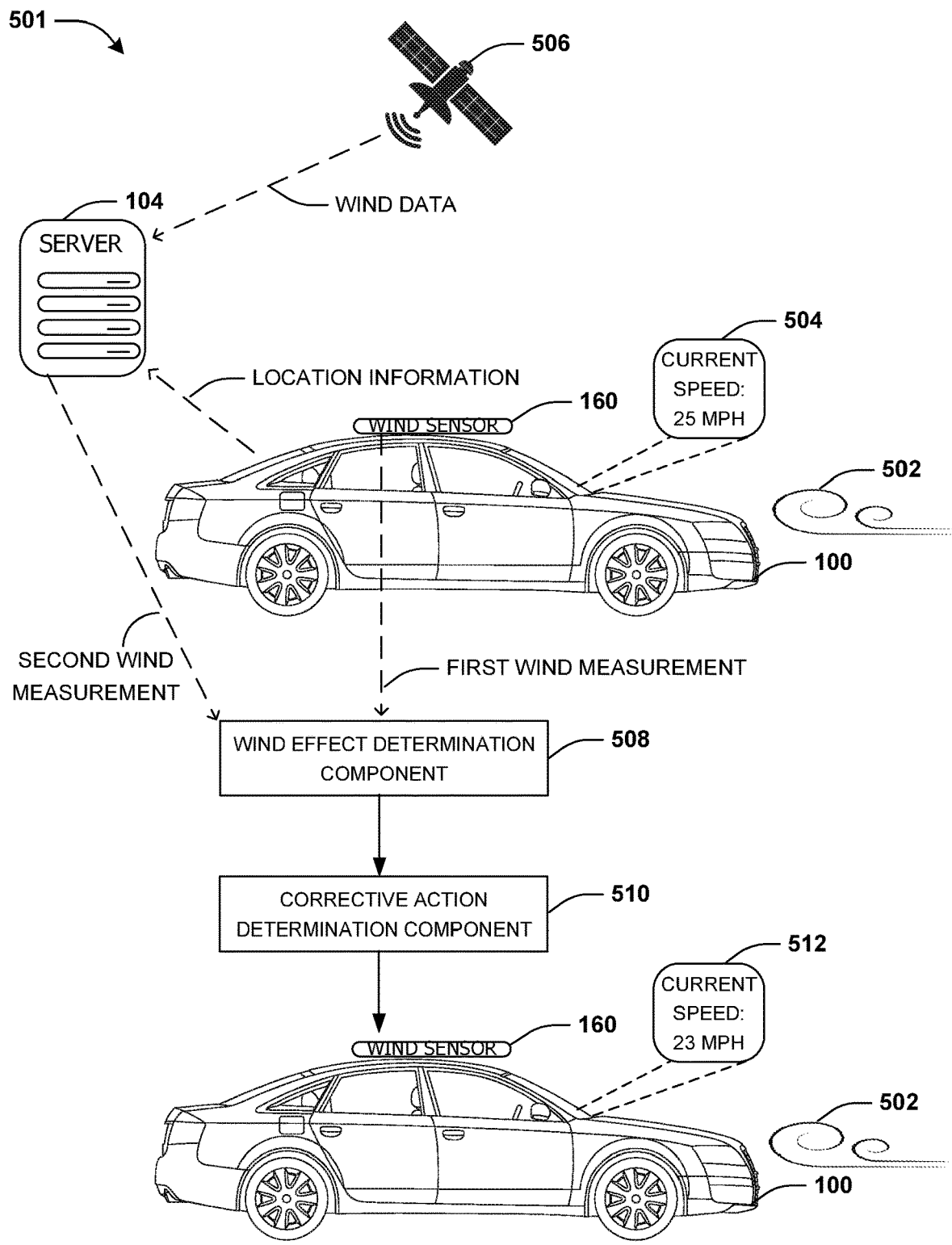
FIG. 5C is a component block diagram illustrating an example system for controlling a motor vehicle based upon wind, where a speed of the motor vehicle is modified.

FIG. 5C illustrates a third scenario where the motor vehicle 100 may be controlled based upon wind 502. The initial interface 504 (e.g., on a dashboard, windshield, etc. of the motor vehicle 100) may display a status of one or more components of the motor vehicle 100, such as, for example, an indication that a speed of the motor vehicle 100 is 25 miles per hour (mph). The wind effect determination component 508 may use the first wind measurement from the wind sensor 160 and/or the second wind measurement from the server 104 to determine the wind effect, and the corrective action determination component 510 may use the wind effect to determine the corrective action, which may be provided to one or more components of the motor vehicle 100 for implementation. For example, as the updated interface 512 may indicate, the speed may be changed from a first speed (e.g., 25 mph) to a second speed (e.g., 23 mph). It may be appreciated that in some embodiments, alternatively and/or additionally to modifying speed, acceleration, revolutions per minute (rpm), and/or other characteristics of the motor vehicle 100 may be modified. For example, when wind measurements indicate that wind is blowing to a rear end of the motor vehicle 100, an rpm of the motor vehicle may be decreased.

Figure 5D:
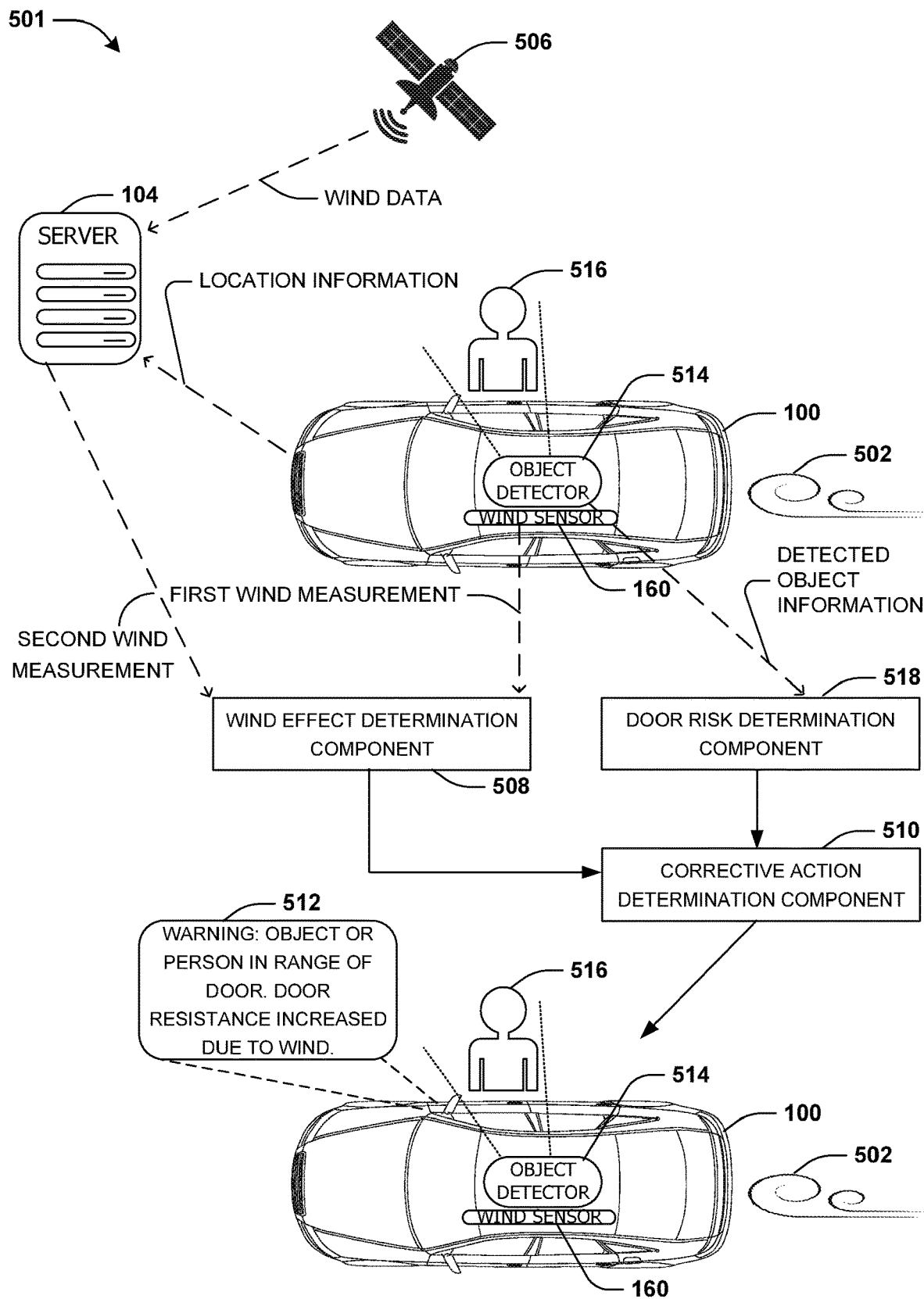
FIG. 5D is a component block diagram illustrating an example system for controlling a motor vehicle based upon wind, where a resistance of opening a door of the motor vehicle is modified.

FIG. 5D illustrates a fourth scenario where the motor vehicle 100 may be controlled based upon wind 502. An object detector 514 may be coupled to the motor vehicle 100, and may provide detected object information comprising an indication that an object has been detected near the motor vehicle 100 (e.g., adjacent to the motor vehicle 100, within a threshold distance of the motor vehicle 100, within a range of one or more doors of the motor vehicle 100) and/or other information about the object (e.g., estimated size, weight, identity, etc.) and/or one or more other objects (e.g., and/or an environment of the motor vehicle 100) to a door risk determination component 518. The door risk determination component 518 may use the detected object information to determine one or more risks associated with the object. For example, a determination may be made as to whether a probability of the door of the motor vehicle physically making (e.g., undesired) contact with (e.g., swinging open and/or striking) the object exceeds a threshold probability (e.g., as a result of the wind). The wind effect determination component 508 may use the first wind measurement from the wind sensor 160 and/or the second wind measurement from the server 104 to determine the wind effect. The corrective action determination component 510 may use the one or more determined risks and/or the probability from the door risk determination component 518 and/or the wind effect from the wind effect determination component 508 to determine the corrective action, which may be provided to one or more components of the motor vehicle 100 for implementation. For example, as an updated interface 512 may indicate, the resistance (e.g., difficulty) associated with opening one or more doors may be changed from a first resistance (e.g., 5 newtons) to a second resistance (e.g., 8 newtons). It may be appreciated that this change may, for example, decrease a chance of a door of the motor vehicle, upon initially being opened partially by a user, from being blown by the wind (e.g., quickly, fully and/or at a speed greater than desired) to unintentionally strike an adjacent pedestrian, vehicle and/or structure.

Figure 5E:
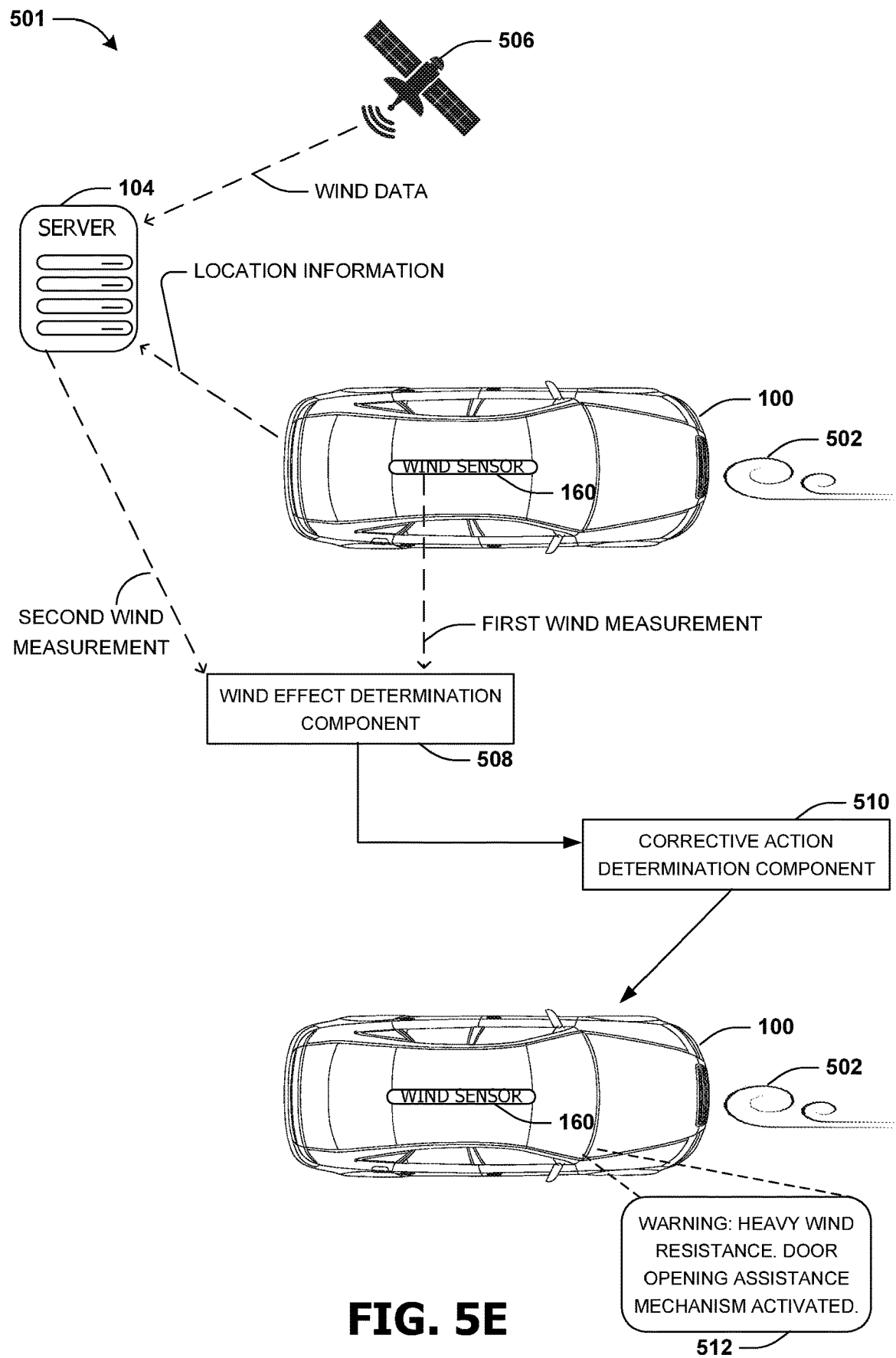
FIG. 5E is a component block diagram illustrating an example system for controlling a motor vehicle based upon wind, where a mechanism to assist in opening a door of the motor vehicle is activated.

FIG. 5E illustrates a fifth scenario where the motor vehicle 100 may be controlled based upon wind 502. The wind effect determination component 508 may use the first wind measurement from the wind sensor 160 and/or the second wind measurement from the server 104 to determine the wind effect, and the corrective action determination component 510 may use the wind effect to determine the corrective action, which may be provided to one or more components of the motor vehicle 100 for implementation. For example, a determination may be made that the wind 502 may increase a level of difficulty for a user to open one or more doors of the motor vehicle 100 (e.g., beyond a threshold difficulty). As the updated interface 512 may indicate, a (e.g., mechanical) mechanism (e.g., using one or more actuators, air and/or oil compression, etc.) to assist in opening one or more doors may be activated (e.g., and thus the difficulty may be changed from a first unacceptable level of difficulty (e.g., requiring the application of 15 newtons of force) to a second acceptable level of difficulty (e.g., requiring the application of 11 newtons of force)).

Figure 6A:
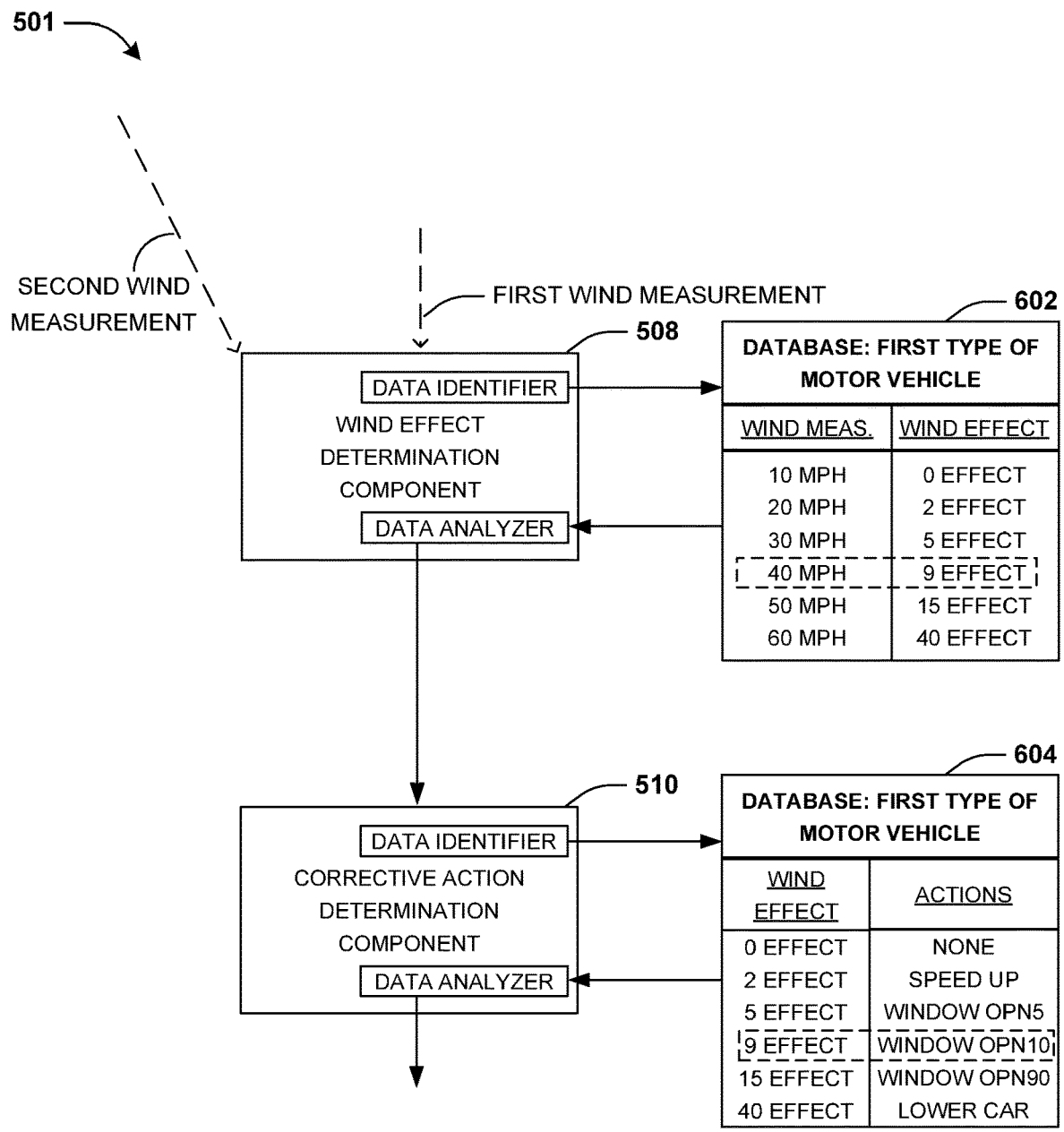
FIG. 6A is a component block diagram illustrating an example system for controlling a motor vehicle based upon wind, where a first database is utilized by a wind effect determination component and a second database is utilized by a corrective action determination component.

FIG. 6A illustrates a sixth scenario where the motor vehicle 100 may be controlled based upon wind. The wind effect determination component 508 may use the first wind measurement from the wind sensor 160 and/or the second wind measurement from the server 104 to determine the wind effect. For example, a data identifier subcomponent of the wind effect determination component 508 may use the first wind measurement and/or the second wind measurement to identify a database 602 from a plurality of databases, access the database 602, and/or compare one or more entries in the database 602 to the first wind measurement, the second wind measurement and/or a combination thereof to identify one or more wind effects associated with the wind measurements. The one or more identified wind effects may be analyzed (e.g., and/or combined, averaged, ranked, filtered, etc.) by a data analyzer subcomponent of the wind effect determination component 508 to determine the (e.g., final) wind effect. The corrective action determination component 510 may use the wind effect to determine the corrective action. For example, a data identifier subcomponent of the corrective action determination component 510 may use the wind effect to identify a database 604 from a plurality of databases, access the database 604, and/or compare one or more entries in the database 604 to the wind effect to identify one or more corrective actions associated with the wind effect. The one or more identified corrective actions may be analyzed (e.g., and/or combined, averaged, ranked, filtered, etc.) by a data analyzer subcomponent of the corrective action determination component 510 to determine the (e.g., final) corrective action. The corrective action may then be provided to one or more components of the motor vehicle 100 for implementation.

Figure 6B:
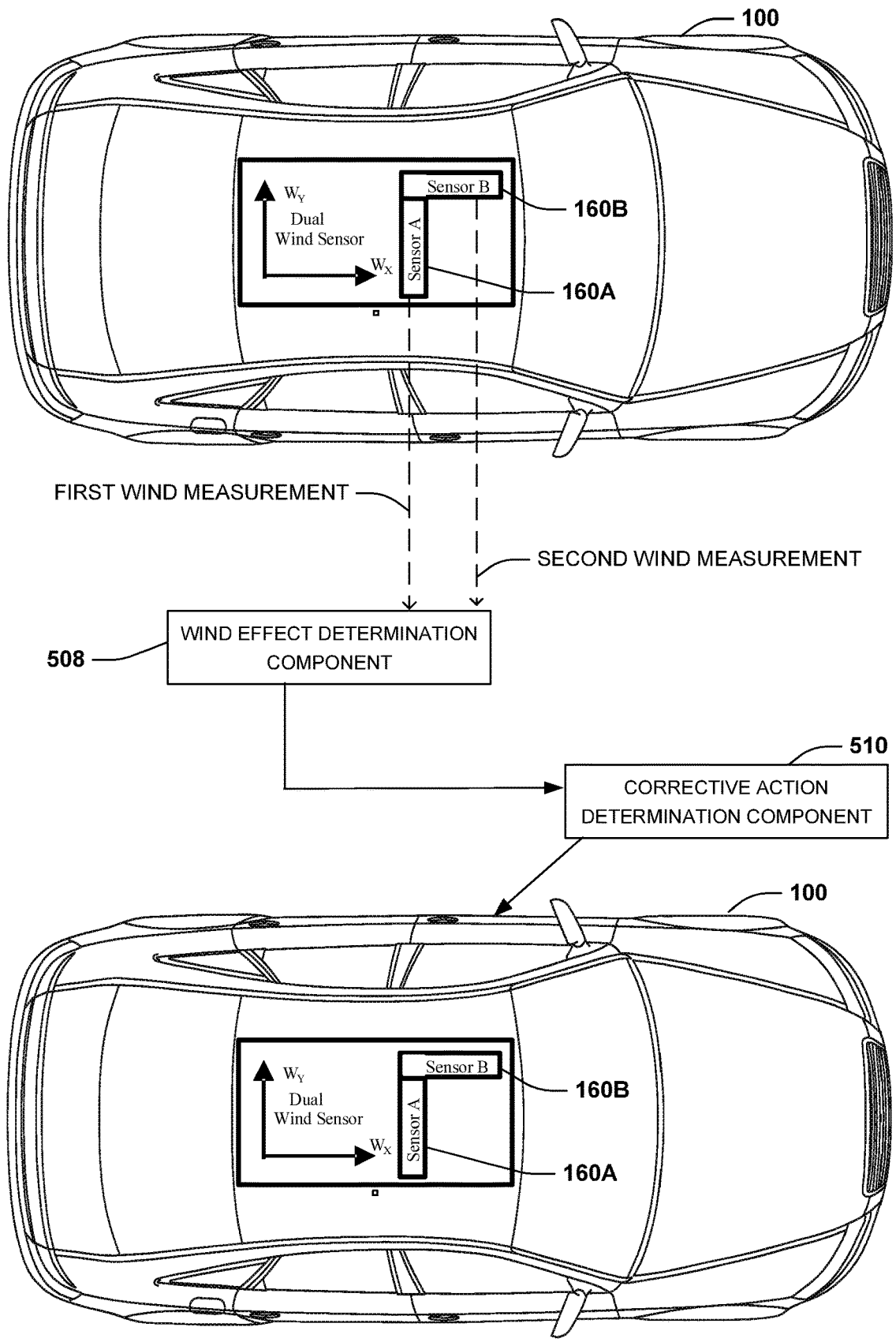
FIG. 6B is a component block diagram illustrating an example system for controlling a motor vehicle based upon wind, where a first wind sensor and a second wind sensor are utilized.

FIG. 6B illustrates a seventh scenario where the motor vehicle 100 may be controlled based upon wind. The wind effect determination component 508 may use the first wind measurement from the first wind sensor 160A and/or the second wind measurement from the second wind sensor 160B to determine the wind effect. The first wind sensor may be configured to detect wind from a first direction, while the second wind sensor may be configured to detect wind from a second direction (e.g., different than the first direction). The second direction may be perpendicular to the first direction. In some embodiments, the second direction may be less than 90 degrees from the first direction, while in other embodiments, the direction may be more than 90 degrees from the first direction. Embodiments with a third sensor, a fourth sensor, or any number of sensors (e.g., each configured to detect wind from a direction a same number of degrees away from a direction of the next sensor) may be contemplated. In an example, one or more of the sensors may be rotating. The corrective action determination component 510 may use the wind effect to determine the corrective action, which may be provided to one or more components of the motor vehicle 100 for implementation.

Figure 6C:
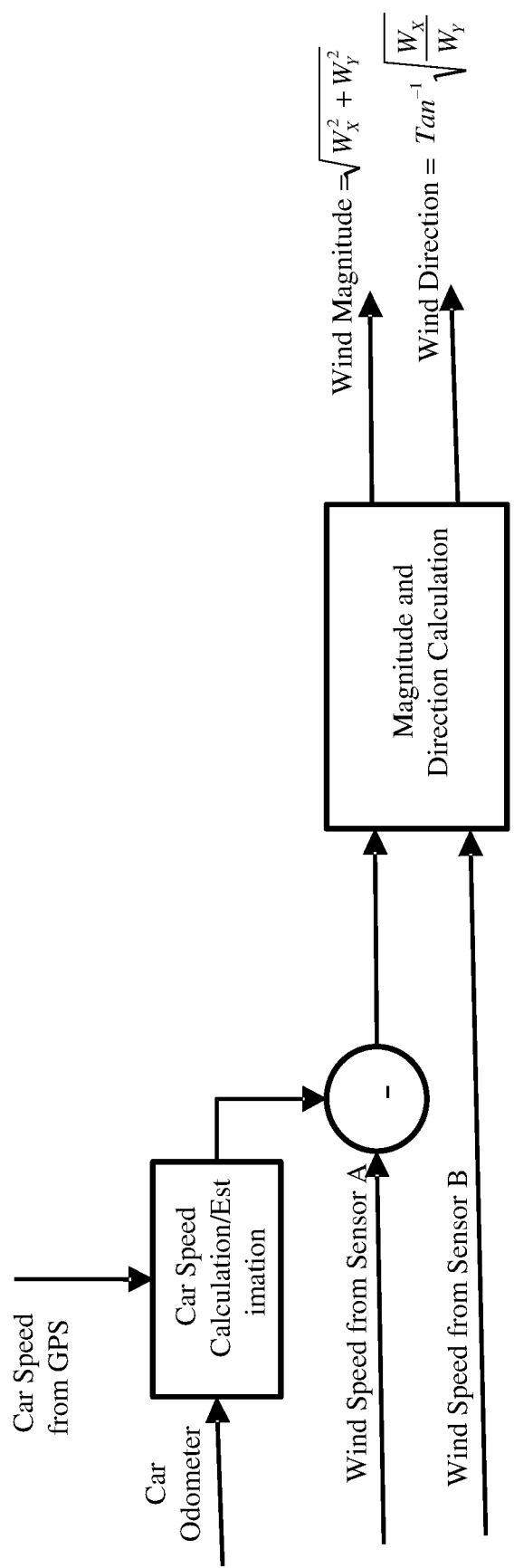
FIG. 6C is a flow chart illustrating an example method for measuring wind.

FIG. 6C illustrates an exemplary manner of measuring wind (e.g., prior to controlling the motor vehicle 100 based upon wind). A motor vehicle speed may be calculated and/or estimated based upon a first motor vehicle speed received from a GPS sensor and/or a second motor vehicle speed received from an odometer. The motor vehicle speed, a first wind speed received from the first wind sensor 160A and/or a second wind speed received from the second wind sensor 160B may be used to determine a magnitude and/or direction of wind.

In an example, one or more of the features, determinations and/or techniques described may further be based upon a profile of a driver of the motor vehicle 100 and/or the motor vehicle itself. The profile may include and/or be created based upon a driving history, maintenance history, shopping records, demographic information (e.g., age, gender, etc.), phone activity, email records and/or internet activity.

It may be appreciated that the techniques for implementing a corrective action other than the examples discussed herein may be contemplated, including various ways of notifying a driver of the wind effect and/or risks or other consequences associated with the wind effect (e.g., via a user interface of the motor vehicle, a flashing light and/or a (e.g., beeping) sound alarm, a message to a mobile device of the driver and/or a parent or other contact of the driver, etc.). It may further be appreciated that one or more of the features, determinations and/or techniques described may be incorporated into existing vehicular (e.g., safety) mechanisms to improve their effectiveness.

In some examples, at least some of the disclosed subject matter may be implemented on a client (e.g., a device of a user), and in some examples, at least some of the disclosed subject matter may be implemented on a server (e.g., hosting a service accessible via a network, such as the Internet). Additionally, it may be appreciated that at least some of one or more of the disclosed techniques, scenarios, etc. may be combined with at least some of one or more of the other disclosed techniques, scenarios, etc.

Figure 7:
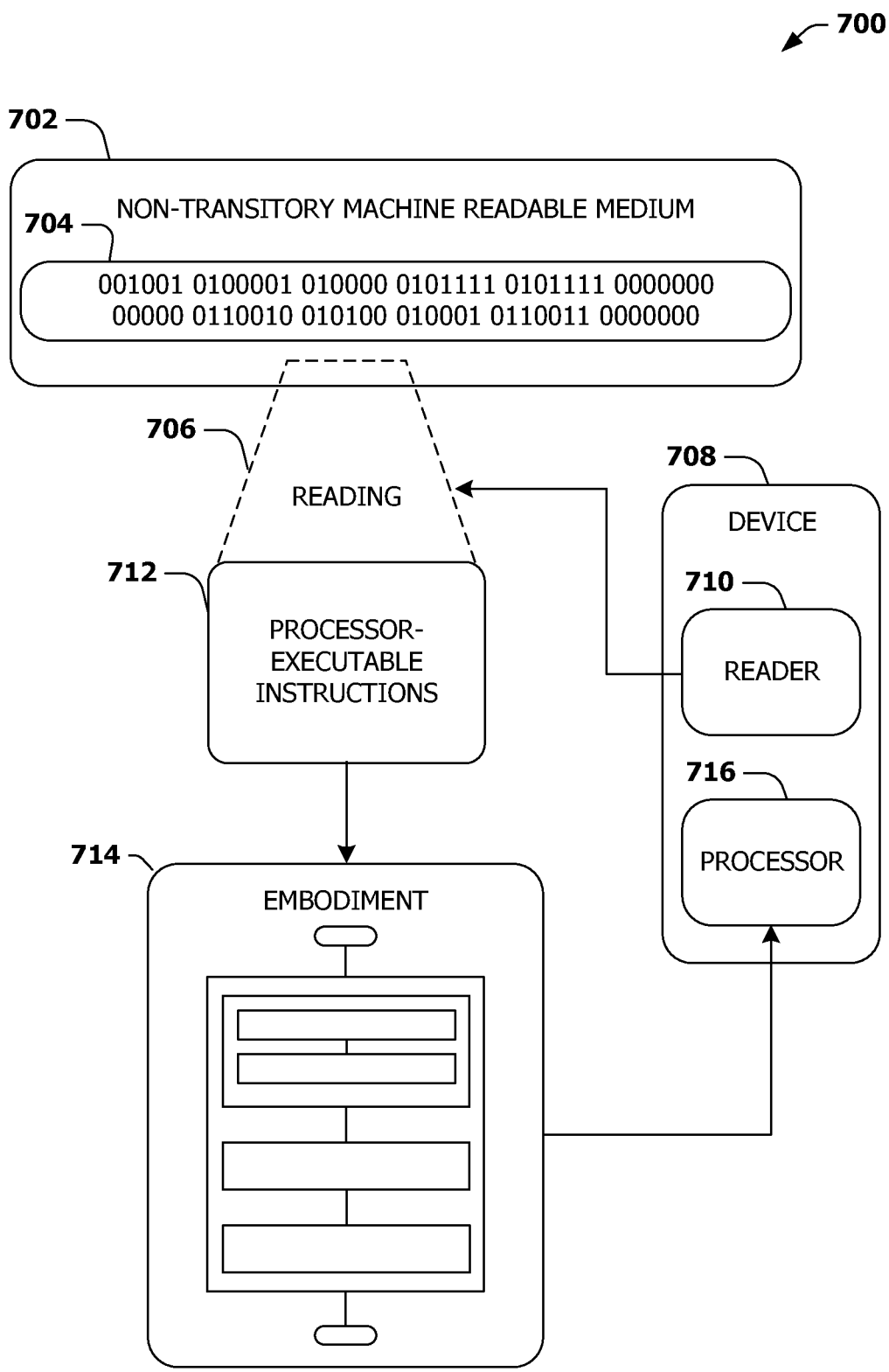
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium having stored thereon processor-executable instructions that when executed cause performance of operations, the operations comprising:
   receiving, from a first sensor coupled to a motor vehicle, a first measurement of wind detected by the first sensor;
   receiving, from a server, a second measurement of wind associated with a location of the motor vehicle;
   determining, at a first time, a wind effect on the motor vehicle based upon the first measurement of wind and the second measurement of wind;
   determining a corrective action for the motor vehicle based upon the wind effect; and
   implementing the corrective action on the motor vehicle, wherein the implementing comprises:
      modifying a drag force on the motor vehicle from a first drag force to a second drag force based upon the wind effect, wherein the modifying the drag force comprises:
         modifying a level of openness of a channel of the motor vehicle from a first level of openness to a second level of openness to modify the drag force on the motor vehicle from the first drag force to the second drag force, wherein:
            the channel comprises a window of the motor vehicle; and
            the modifying the level of openness comprises lowering the window from the first level of openness to the second level of openness to modify the drag force on the motor vehicle responsive to determining that weather associated with the motor vehicle at the first time is suitable;
   determining, at a second time, a second wind effect on the motor vehicle;
   determining a second corrective action for the motor vehicle based upon the second wind effect on the motor vehicle, wherein the second corrective action corresponds to modifying the drag force on the motor vehicle from a third drag force to a fourth drag force based upon lowering the window from a third level of openness to a fourth level of openness;
   responsive to determining that second weather associated with the motor vehicle at the second time is not suitable:
      determining whether the second wind effect on the motor vehicle exceeds a threshold urgency corresponding to a level of inconvenience associated with the second weather; and
      responsive to determining that the second wind effect exceeds the threshold urgency corresponding to the level of inconvenience, lowering the window from the third level of openness to the fourth level of openness;
   determining, at a third time, a third wind effect on the motor vehicle;
   determining a third corrective action for the motor vehicle based upon the third wind effect on the motor vehicle, wherein the third corrective action corresponds to modifying the drag force on the motor vehicle from a fifth drag force to a sixth drag force based upon lowering the window from a fifth level of openness to a sixth level of openness; and
   responsive to determining that third weather associated with the motor vehicle at the third time is not suitable:
      determining whether the third wind effect on the motor vehicle exceeds a second threshold urgency corresponding to a second level of inconvenience associated with the third weather; and
      responsive to determining that the third wind effect does not exceed the second threshold urgency corresponding to the second level of inconvenience, not lowering the window from the fifth level of openness to the sixth level of openness regardless of the third corrective action determined based upon the third wind effect.

2. The non-transitory machine readable medium of claim 1, wherein the modifying the drag force comprises:
   modifying a seventh level of openness of a second channel of the motor vehicle from an eighth level of openness to a ninth level of openness, wherein the second channel comprises:
      a first opening on a front surface of the motor vehicle, wherein the front surface has at least one of a front bumper, a front hood or a headlight; and
      a second opening on a rear surface of the motor vehicle, wherein the rear surface has at least one of a rear bumper, a trunk or a rear light, wherein the second channel is through a body of the motor vehicle.

3. The non-transitory machine readable medium of claim 1, wherein the modifying the drag force from the first drag force to the second drag force comprises:
   lowering a second window, different than the window, to a different level of openness than the second level of openness of the window.

4. The non-transitory machine readable medium of claim 3, wherein the operations comprise:
   determining that a combination of at least the second level of openness of the window with the different level of openness of the second window provides for an optimum change in the drag force.

5. The non-transitory machine readable medium of claim 4, wherein the different level of openness of the window is a partial level of openness.

6. The non-transitory machine readable medium of claim 4, wherein the second level of openness of the window is a first partial level of openness and the different level of openness of the window is a second partial level of openness.

7. The non-transitory machine readable medium of claim 1, wherein the modifying the drag force from the first drag force to the second drag force is performed based upon a determination that the motor vehicle is likely to perform with a higher level of stability, in view of the wind effect, at the second drag force.

8. The non-transitory machine readable medium of claim 1, wherein the modifying the drag force from the first drag force to the second drag force is performed based upon a determination that the motor vehicle is likely to perform with a higher level of safety, in view of the wind effect, at the second drag force.

9. The non-transitory machine readable medium of claim 1, wherein the modifying the drag force from the first drag force to the second drag force is performed based upon a determination that the motor vehicle is likely to perform with a higher level of efficiency, in view of the wind effect, at the second drag force.

10. The non-transitory machine readable medium of claim 1, wherein the modifying the drag force from the first drag force to the second drag force is performed based upon a determination that the motor vehicle is likely to perform with a higher level of stability, a higher level of safety and a higher level of efficiency, in view of the wind effect, at the second drag force.

11. The non-transitory machine readable medium of claim 1, wherein the second level of openness of the window is a partial level of openness.

12. A method comprising:
receiving, from a first sensor coupled to a motor vehicle, a first measurement of wind detected by the first sensor;
receiving, from a server, a second measurement of wind associated with a location of the motor vehicle;
determining, at a first time, a wind effect on the motor vehicle based upon the first measurement of wind and the second measurement of wind;
determining a corrective action for the motor vehicle based upon the wind effect; and
implementing the corrective action on the motor vehicle, wherein the implementing comprises:
  modifying a drag force on the motor vehicle from a first drag force to a second drag force based upon the wind effect, wherein the modifying the drag force comprises:
    modifying a level of openness of a channel of the motor vehicle from a first level of openness to a second level of openness to modify the drag force on the motor vehicle from the first drag force to the second drag force, wherein:
      the channel comprises a window of the motor vehicle; and
      the modifying the level of openness comprises lowering the window from the first level of openness to the second level of openness to modify the drag force on the motor vehicle responsive to determining that weather associated with the motor vehicle at the first time is suitable;
determining, at a second time, a second wind effect on the motor vehicle;
determining a second corrective action for the motor vehicle based upon the second wind effect on the motor vehicle, wherein the second corrective action corresponds to modifying the drag force on the motor vehicle from a third drag force to a fourth drag force based upon lowering the window from a third level of openness to a fourth level of openness; and
responsive to determining that second weather associated with the motor vehicle at the second time is not suitable:
  determining whether the second wind effect on the motor vehicle exceeds a threshold urgency corresponding to a level of inconvenience associated with the second weather; and
  responsive to determining that the second wind effect exceeds the threshold urgency corresponding to the level of inconvenience, lowering the window from the third level of openness to the fourth level of openness.

13. A method comprising:
receiving, from a first sensor coupled to a motor vehicle, a first measurement of wind detected by the first sensor;
receiving, from a server, a second measurement of wind associated with a location of the motor vehicle;
determining, at a first time, a wind effect on the motor vehicle based upon the first measurement of wind and the second measurement of wind;
determining a corrective action for the motor vehicle based upon the wind effect; and
implementing the corrective action on the motor vehicle, wherein the implementing comprises:
  modifying a drag force on the motor vehicle from a first drag force to a second drag force based upon the wind effect, wherein the modifying the drag force comprises:
    modifying a level of openness of a channel of the motor vehicle from a first level of openness to a second level of openness to modify the drag force on the motor vehicle from the first drag force to the second drag force, wherein:
      the channel comprises a window of the motor vehicle; and
      the modifying the level of openness comprises lowering the window from the first level of openness to the second level of openness to modify the drag force on the motor vehicle responsive to determining that weather associated with the motor vehicle at the first time is suitable;
determining, at a second time, a second wind effect on the motor vehicle;
determining a second corrective action for the motor vehicle based upon the second wind effect on the motor vehicle, wherein the second corrective action corresponds to modifying the drag force on the motor vehicle from a third drag force to a fourth drag force based upon lowering the window from a third level of openness to a fourth level of openness; and
responsive to determining that second weather associated with the motor vehicle at the second time is not suitable:
  determining whether the second wind effect on the motor vehicle exceeds a threshold urgency corresponding to a level of inconvenience associated with the second weather; and
  responsive to determining that the second wind effect does not exceed the threshold urgency corresponding to the level of inconvenience, not lowering the window from the third level of openness to the fourth level of openness regardless of the second corrective action determined based upon the second wind effect.

* * * * *